(12) United States Patent
Trad et al.

(10) Patent No.: US 9,091,788 B2
(45) Date of Patent: Jul. 28, 2015

(54) DEVICE AND METHOD FOR DE-BLENDING SIMULTANEOUS SHOOTING DATA WITH APEX SHIFTED RADON TRANSFORM

(75) Inventors: Daniel Trad, Calgary (CA); Risto Siliqi, Paris (FR)

(73) Assignee: CGGVERITAS SERVICES SA, Massy Cedex (FR)

(*) Notice: Subject to any disclaimer, the term of this patent is extended or adjusted under 35 U.S.C. 154(b) by 707 days.

(21) Appl. No.: 13/468,472

(22) Filed: May 10, 2012

(65) Prior Publication Data

US 2013/0121110 A1    May 16, 2013

Related U.S. Application Data (60) Provisional application No. 61/559,367, filed on Nov. 14, 2011.

(51) Int. Cl.
*G01V 1/00* (2006.01)
*G01V 1/36* (2006.01)
*G01V 1/32* (2006.01)

(52) U.S. Cl.
CPC . *G01V 1/364* (2013.01); *G01V 1/32* (2013.01); *G01V 2210/244* (2013.01); *G01V 2210/46* (2013.01)

(58) Field of Classification Search
CPC ........... G01V 1/32; G01V 1/34; G01V 1/325; G01V 2210/46

USPC .......................................................... 367/38
See application file for complete search history.

(56) References Cited

U.S. PATENT DOCUMENTS 8,675,447 B2 *  3/2014  Poole .............................. 367/41

OTHER PUBLICATIONS

Daniel Trad, "Interpolation and Multiple Attenuation with Migration Operators", Geophysics vol. 68 No. 6, Nov.-Dec. 2003, pp. 2043-2054.
Daniel Trad, "Interpolation with Migration Operators", SEG Int'l Exposition and 72nd Annual Meeting, Salt Lake City, Utah, Oct. 6-11, 2002.

* cited by examiner

*Primary Examiner* — Mark Hellner
(74) *Attorney, Agent, or Firm* — Patent Portfolio Builders PLLC (57) ABSTRACT

A device, medium and method for de-blending seismic data associated with a subsurface of the earth. The method includes receiving blended seismic data, wherein the blended seismic data includes traces having energies from two or more different shots that partially overlap; applying an apex-shifted radon transform (ASRT) to the blended seismic data to transform it from a first domain to a second domain; applying a mute processing for removing all shots except a first shot in the second domain; applying a reverse ASRT to the given shot to obtain the first shot in the first domain; and generating an image of the subsurface based on the first shot in the first domain. The procedure may be iteratively repeated to separate all shots.

20 Claims, 8 Drawing Sheets

DEVICE AND METHOD FOR DE-BLENDING SIMULTANEOUS SHOOTING DATA WITH APEX SHIFTED RADON TRANSFORM

CROSS-REFERENCE TO RELATED APPLICATIONS

The present application is related to and claims the benefit of priority of U.S. Provisional Application Ser. No. 61/559,367, filed on Nov. 14, 2011, having the title "Deblending Using Apex Shifted Radon Transform," and being authored by D. Trad and R. Siliqi, the entire content of which is incorporated herein by reference.

BACKGROUND

1. Technical Field

Embodiments of the subject matter disclosed herein generally relate to methods and systems for generating, acquiring and processing seismic data and, more particularly, to mechanisms and techniques for de-blending recorded seismic data generated by simultaneously activated plural seismic sources.

2. Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

In the past, conventional land seismic acquisition generally employed multiple vibrators (seismic sources) acting one at a time. In land-based operations, the vibrators are positioned at a source location and then actuated. Once activated, the vibrators generate a sweep that typically lasts between five and twenty seconds and typically spans a predetermined range of frequencies. A recording system that is connected to a plurality of receivers, typically geophones for land-based seismic exploration, is employed to receive and record the response data. For reflection seismology, the record length is typically set to equal the sweep length plus a listen time equal to the two-way travel time, which is the time required for the seismic energy to propagate from the source through the earth to the deepest reflector of interest and back to the receiver. The vibrators are then moved to a new source location and the process is repeated.

For marine seismic acquisition, traditionally, a vessel tows plural streamers having multiple seismic receivers configured to record seismic data. The vessel also tows a seismic source that imparts energy into the water. The seismic energy travels toward the subsurface and is partially reflected back to the sea surface. The seismic recorders record the reflected seismic waves.

When the source (either land source or marine source) is fired, a subsequent recording time is delayed with a delay time so that all useful reflected/diffracted energies are recorded before the next shot is fired. This delay time imposes constraints on the acquisition rate (i.e., slows down the acquisition process) and, hence, increases the cost of acquisition.

To reduce the acquisition time, to increase the shot density, or to increase the illumination of subsurface, it is possible to simultaneously shoot two or more sources. Acquisition of simultaneous source data means that the signals from two or more sources interfere at least for part of the record. By acquiring data in this way, the time taken to shoot a dataset is reduced along with the acquisition costs. As an alternative to reducing the acquisition time, a higher density dataset may be acquired in the same time. For such data to be useful, it is necessary to develop processing algorithms to handle source interference (cross-talk noise).

Source interference appears because subsurface reflections from an early source excitation may be comingled with those that have been sourced later, i.e., a "blended source" survey is acquired. Note that this is in contrast to conventional surveying techniques (discussed above), wherein the returning subsurface reflections from one source are not allowed to overlap with the reflections of another source. Although the blended-source approach has the potential to reduce the time in the field, thereby reducing the cost of the survey, one problem is that it can be difficult to separate the individual shots thereafter. In other words, what is needed in interpreting seismic data is the depth of each reflector, and the depth of a reflector is determined by reference to its two-way seismic travel time. Thus, in a multiple-source survey it is the goal to determine which of the observed subsurface reflections is associated with each source, i.e., to de-blend the data; otherwise, its two-wave travel time cannot be reliably determined.

Figure 1A:
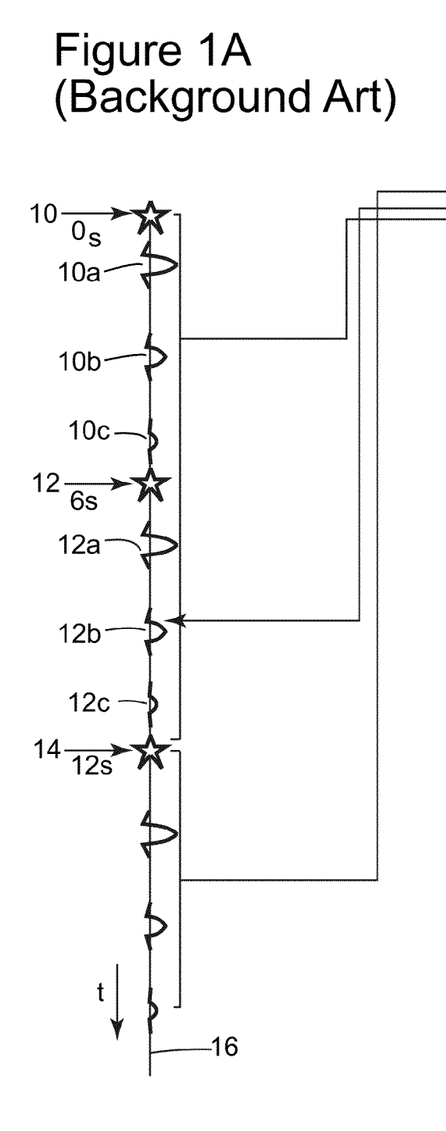
FIGS. 1A-B are graphical illustrations of un-blended seismic data.
Figure 1B:
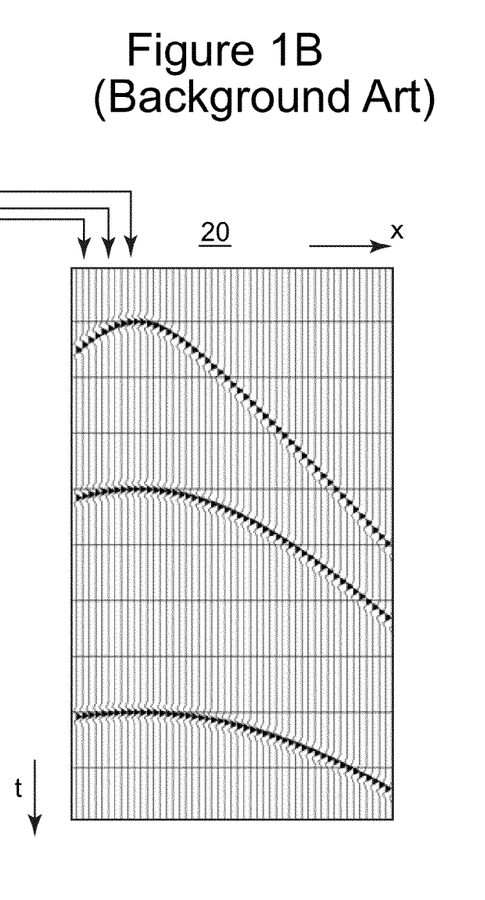

In this regard, FIG. 1A shows sources being actuated at different spatial positions 10, 12 and 14 with a delay time such that the recorded wavelets 10a-c corresponding to spatial position 10 do not interfere (in time) with wavelets 12a-c corresponding to spatial position 12. The signal recorded at the receiver can be considered as a continuous recording (16) or separated to form regular seismic traces for each individual shot as shown in FIG. 1B. The traces illustrated in FIG. 1B form a receiver gather 20. Each trace in the receiver gather 20 relates to a different shot and has a different position on axis X, and each wavelet has a different time on a temporal axis t.

Figure 2A:
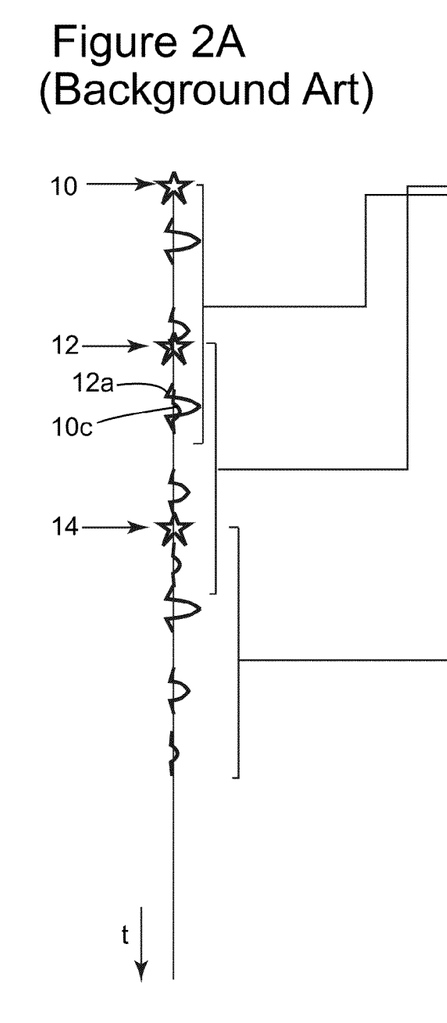
FIGS. 2A-B are graphical illustrations of blended seismic data.
Figure 2B:
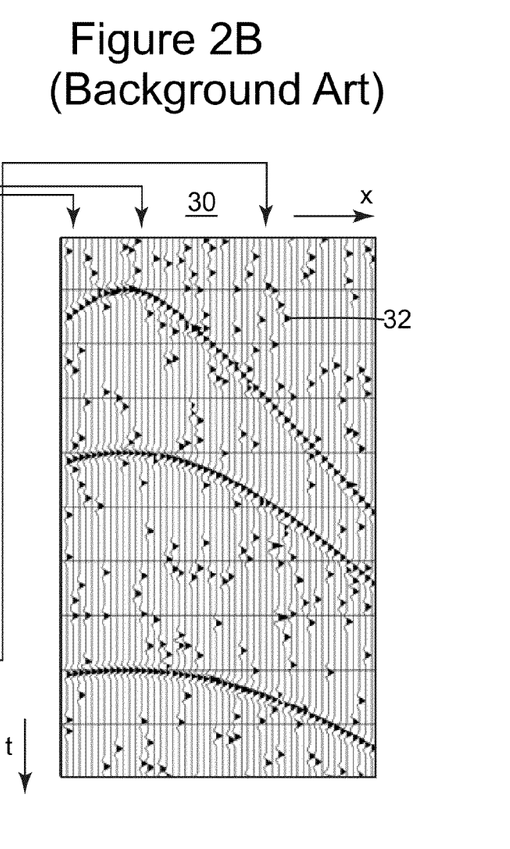

FIG. 2A shows a similar source configuration as in FIG. 1A, but now the sources are simultaneously activated so that, for example, the wavelet 10c might be superposed (in time) with the wavelet 12a. FIG. 2B shows the receiver gather 30 formed though pseudo-de-blending. Pseudo-deblending involves forming regular seismic traces from the continuous recording based on the start time of the actuation of each shot with no attempt to mitigate cross-talk noise. The data of FIG. 2B has been shot in less time than the data in FIG. 1B, but cross-talk 32 is observed and noise on one trace is signal on another trace.

Thus, for the gather 30 in FIG. 2B, it is necessary to separate the energy associated with each source (de-blend) as a preprocessing step, and then to proceed with conventional processing tools.

Various processing tools for de-blending seismic data are known in the art. However, most of these processing tools involve shot coordinates, either directly or through offset and azimuth. This is a problem because in simultaneous source acquisition, each trace has several shot locations. Simple replication of traces for different shots allows conventional processing but at the cost of undesired energy in the form of leaking noise. Some processes in the seismic sequence are robust enough to handle this noise but some others seem to require a de-blending up-front. Experience on this problem is quite limited, but it is believed that the separation does not need to be perfect, just like noise attenuation is never perfect. In fact the separation may probably only be required in an initial state for noise attenuation and velocity analysis and could probably be reverted before final migration.

Thus, there is a need to develop a method capable of processing blended seismic data while not being limited as noted above.

SUMMARY OF THE INVENTION

According to an exemplary embodiment, there is a method for de-blending seismic data associated with a subsurface of the earth. The method includes a step of receiving blended seismic data, wherein the blended seismic data includes traces having energies from two or more different shots that partially overlap; a step of applying an apex-shifted radon transform (ASRT) to the blended seismic data to transform it from a first domain to a second domain; a step of applying a mute processing for removing all shots except a first shot in the second domain; a step of applying a reverse ASRT to the given shot to obtain the first shot in the first domain; and a step of generating an image of the subsurface based on the first shot in the first domain.

According to another exemplary embodiment, there is a computing device configured to de-blend seismic data associated with a subsurface of the earth. The computing device includes an interface configured to receive blended seismic data, wherein the blended seismic data includes traces having energies from two different shots that partially overlap; and a processor connected to the interface. The processor is configured to apply an apex-shifted radon transform (ASRT) to the blended seismic data to transform it from a first domain to a second domain; apply a mute processing for removing all shots except a first shot in the second domain; apply a reverse ASRT to the given shot to obtain the first shot in the first domain; and generate an image of the subsurface based on the first shot in the first domain.

According to still another exemplary embodiment, there is a non-transitory computer readable medium including computer executable instructions, wherein the instructions, when executed by a processor, implement the method described above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic system. However, the embodiments to be discussed next are not limited to a marine seismic system, but may be applied to a land seismic system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for de-blending seismic data acquired by simultaneous shooting. In one application, the de-blending is achieved by using an Apex Shifted Radon Transform. This transform works as a normal hyperbolic Radon transform, but instead of assigning a unique value for the hyperbolic apexes, it considers every point of the gather as a possible apex. Seismic coherent events are collapsed towards apexes, and separated by mute processing and subtraction. The collapsing of the apexes may be achieved by Least Squares High-Resolution Post-Stack Migration. In one application, the novel method does not require offset, azimuth and velocity information as it works on a channel at a time, which makes it simple and fast.

As was described in Trad 2002 ("Interpolation with migration operators," 72th Ann. Internat. Mtg Soc. Explo. Geophys., Expanded Abstracts. SP5.5, 2174-2177, 2002) and Trad 2003 ("Interpolation and multiple attenuation with migration operators," Geophysics, vol. 68, no. 6, 2043-2054, 2003), an apex-shifted Radon transform (ASRT) can be applied with success to collapse hyperbolic events even if they have apexes located at different positions. Thus, according to an exemplary embodiment, it is possible to use this tool to focus the blended signals onto different non-overlapping areas. Because information about the coordinates of the shots is not required, it does not matter that every trace contains many shot locations.

This tool is a generalization of a Hyperbolic Radon transform (HRT) in the sense that ASRT collapses hyperbolic events into points, but, contrary to HRT, the ASRT does not assume that the apexes of all events are collocated at the same space coordinate. Thus, the ASRT collapse any hyperbolic event with apex on any space location towards its apex. A general mathematical equation for this transformation is given by d=Lm, where d is the recorded data in the time-space domain, m is the model describing the data in another domain, and L is an operator transforming the data from the time-space domain to the model in the another domain. If the ASRT transform is used, then m is the ASRT model. More specifically, this equation may be written as:

$$\text{model}(\tau,\alpha,\upsilon)=\Sigma_{x=x(1)}^{x(nx)}\text{data}(t(\tau,\alpha,\upsilon),x), \quad (1)$$

where "data" represents the recorded data, "model" represents the constructed model that describes the data "data," and t is the travel time of the data at offset x. The time t may be a function of the model parameters $(\tau, \alpha, \upsilon)$ as follows:

$$t = \left[\left(\frac{\tau}{2}\right)^2 + \left(\frac{x-\alpha}{v}\right)^2\right].\quad(2)$$

Parameters $\tau$ and $\alpha$ are the location coordinates (time and space) of the apexes of hyperbolic events, and $\upsilon$ is the velocity parameter that defines the curvature of each event on each apex. For every point of the model, all the samples corresponding to the data at coordinates (t, x) are stacked together.

Although the transformation of equation (1) is enough to separate blended shots, additional work is required to accurately invert the data, i.e., with correct amplitudes (it is noted that after the separation, the data has to be inverted to the time-space domain). To create a model capable of directly predicting the data, the transformation of equation (1) is calculated on a least squares sense, by finding a model such that the transformation:

$$\text{data}(t(\tau,\alpha,\upsilon),x)_{pred} = \Sigma_{\upsilon=1}{}^{n\upsilon}\Sigma_{\alpha=\alpha(1)}{}^{\alpha(m\alpha)}\text{model}(\tau,\alpha,\upsilon)\quad(3)$$

predicts the data "data" with the minimum square error:

$$J = \|\text{data} - \text{data}_{pred}\|_2,\quad(4)$$

where J is a cost function and $\|\ \|$ is an L2 norm. In equation (3), n represents a number of points on the data space, or equivalently, the number of possible apexes.

In addition, to improve the focusing of the novel approach, the L1 norm of the model may be minimized as follows:

$$J = \|\text{data} - \text{data}_{pred}\|_2 + \mu\|\text{model}\|_1,\quad(5)$$

where $\mu$ is a hyper-parameter indicating that the data residuals and the model complexity are not weighted in the same way. The relative weight of the two norms balances data fitting versus model complexity, and removes from the model sampling artifacts.

To perform the minimization in equation (5), an optimization technique known as sparse inversion may be utilized (see Trad, 2003). The used implementation incorporates the sparseness of the model onto the operator design. This eliminates the hyper-parameter and allows controlling the degree of sparseness through a simple model weighting. Also, instead of linear programming for the L1 norm, a model weight may be applied to make the L2 norm to behave as the L1 norm.

Once the data is mapped into the ASRT model, a mute process is applied to the ASRT model. The mute process removes part of the data in the model that is considered to belong to other shots. Usually, all the energy that comes from the same shot maps to apexes located around the same spatial coordinates, but signals from different shots map to different apex locations. This makes mute by localization appropriate to separate shots at different distance from the receivers. The mute process may be based not only on the localization of the shots, but also on their amplitude, as discussed later.

Figure 3A:
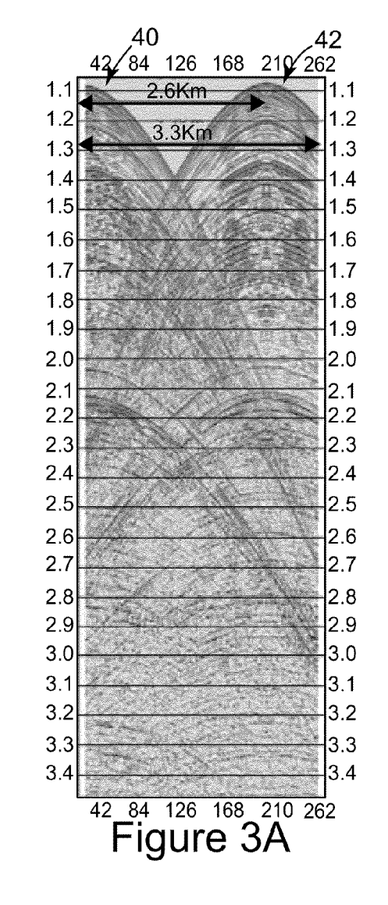
FIG. 3A illustrates exemplary blended seismic data in a first domain according to an exemplary embodiment.

Regarding the mute by localization, FIG. 3A shows a simple synthetic example in which two shots 40 and 42 are recorded with a streamer survey. The X axis of FIG. 3A indicates the offset and the Y axis indicates the time. The darker a point in the figures it is, the higher its amplitude.

Figure 3B:
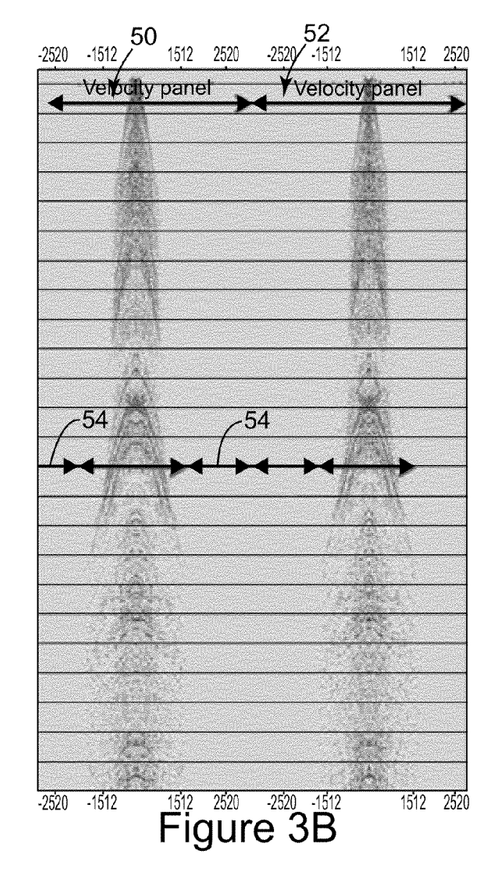
FIG. 3B illustrates the data of FIG. 3A transformed in a second domain according to an exemplary embodiment.

The data of FIG. 3A is ASRT transformed as illustrated in FIG. 3B. Usually, all the energy that comes from the same shot maps to apexes located around the same spatial coordinate, but signals from different shots map to different apex locations as illustrated in FIG. 3B. This fact makes the process of mute by localization enough to separate shots at different distances from the receivers.

FIG. 3B shows two velocity panels 50 and 52 to which mute corridors 54 have been applied. More than two velocity panels may be used. In this respect, it is noted that equation (3) refers to "nv" velocity panels. The width of the mute corridor may be chosen based on, for example, the shot separation, the spread of the collapsed events or experience. One possibility is to choose a width of the mute corridor to be about the number of traces between consecutive shots. Other values are possible depending on the application and in general, can be defined by simple observation of the transform or one shot record.

Figure 3C:
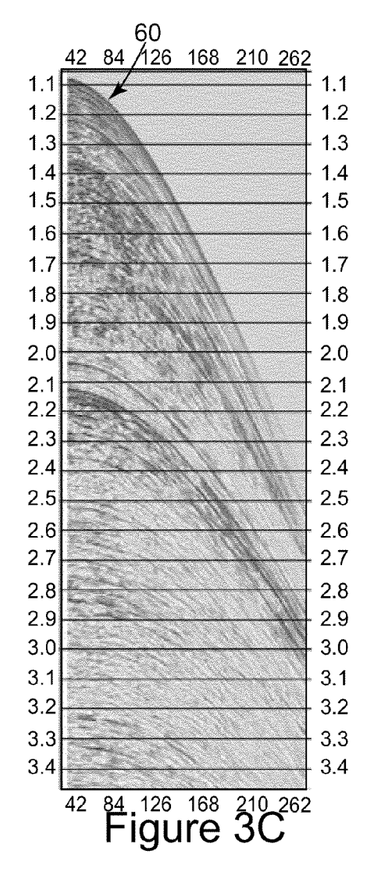
FIG. 3C illustrates un-blended data corresponding to the blended data of FIG. 3A according to an exemplary embodiment.

After the model has been muted, it is reverse transformed to the data domain to generate one shot 60 as illustrated in FIG. 3C. Thus, the data from multiple velocity panels is used to generate the predicted shot 60. Having this data, the method may subtract the shot 60 from the original blended data and the process discussed above may be repeated to isolate each shot.

When the operator L does not properly match the curvature or shape of the event, for example, because the velocity is approximated, the energy spreads over a larger area, and the mute corridor has to be made wider to avoid event truncation. However, as long as the mute does not truncate the events, the amplitudes are correctly predicted. This is the reason why this novel method does not need precise velocities and a coarse approximation is enough.

Additional separation based on amplitudes across different velocity panels is also possible. Thus, for these situations, another or an additional criterion needs to be used to de-blend the data. This criterion may be based on a statistical threshold amplitude of the events. Because different shots may focus with different velocities and therefore, they collapse on different degree through the ASRT velocity panels, the shots also have different amplitudes. The better the focusing of the energy the larger is the amplitude. A mute by amplitude across different velocity panels permits to separate shots according to the velocities with which they collapse. Also, the amplitude mute can be used to separate shots in domains where their coherence is different, for example because of time delays.

Although, in principle, the ASRT transformation could be many times more expensive than a Radon Transform, the ASRT operator can be efficiently implemented using migration algorithms, because, by exchanging the midpoint and receiver locations, both ASRT and post-stack migration have a similar mathematical expression (Trad, 2002, 2003).

The ASRT operator may take various forms. For the examples shown in this application, the Stolt's operator (see Trad 2003 for details) has been used for efficiency. However, any other operator can be used, for example, Kirchhoff and Gazdag operators, but Stolt's operator is more efficient which is advantageous for the iterative algorithm. To overcome the lack of capability of the operator to handle vertical velocity variations, a fit to purpose time stretching may be applied to the data. Changing the stretching has the effect of collapsing the events with different velocities just as if the operator could handle it internally.

Figure 4A:
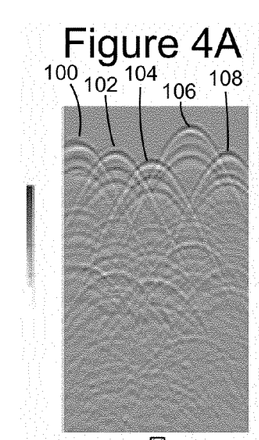
FIGS. 4A-J illustrate a process of separating shots from blended data according to an exemplary embodiment.
Figure 4B:
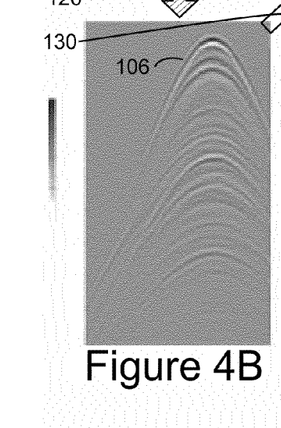
Figure 4C:
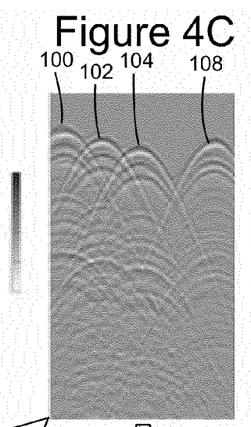
Figure 4D:
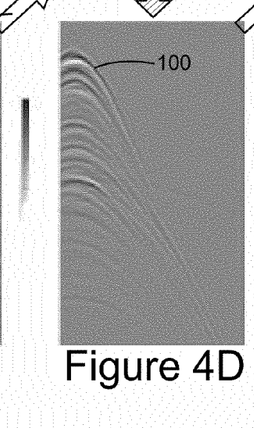
Figure 4E:
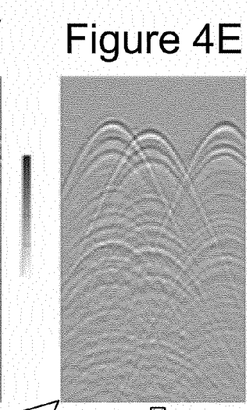
Figure 4F:
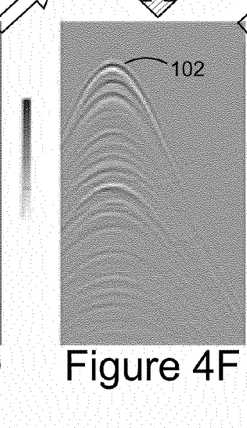
Figure 4G:
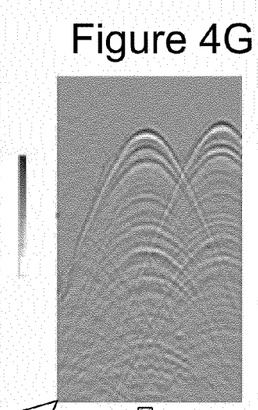
Figure 4H:
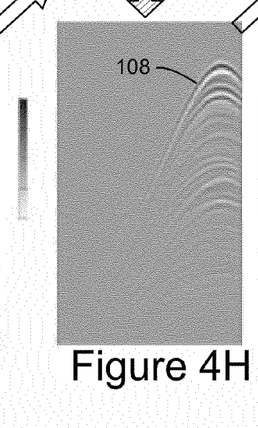
Figure 4I:
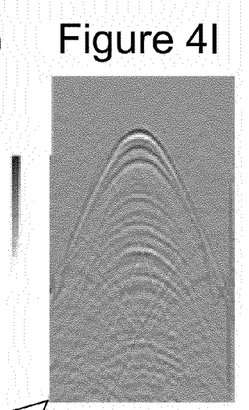
Figure 4J:
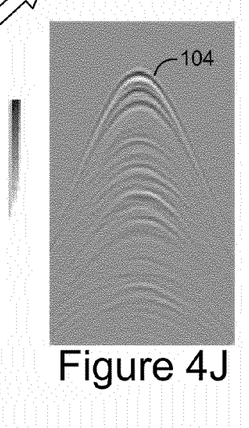

It the shots are not acquired simultaneously, but with some delay, an additional first break algorithm can be used to select the location of the shots for every shot. This is illustrated in FIGS. 4A-J. FIG. 4A shows recorded seismic data that corresponds to events 100, 102, 104, 106 and 108. Then, the data is ASRT transformed in step 120 and muted to isolate the first shot 106 as shown in FIG. 4B. The first shot 106 is then subtracted in step 130 from the original data so that the remaining data includes all the shots except the first shot 106 as illustrated in FIG. 4C. The process continues until all the shots are separated, i.e., the data is de-blended.

Figure 5:
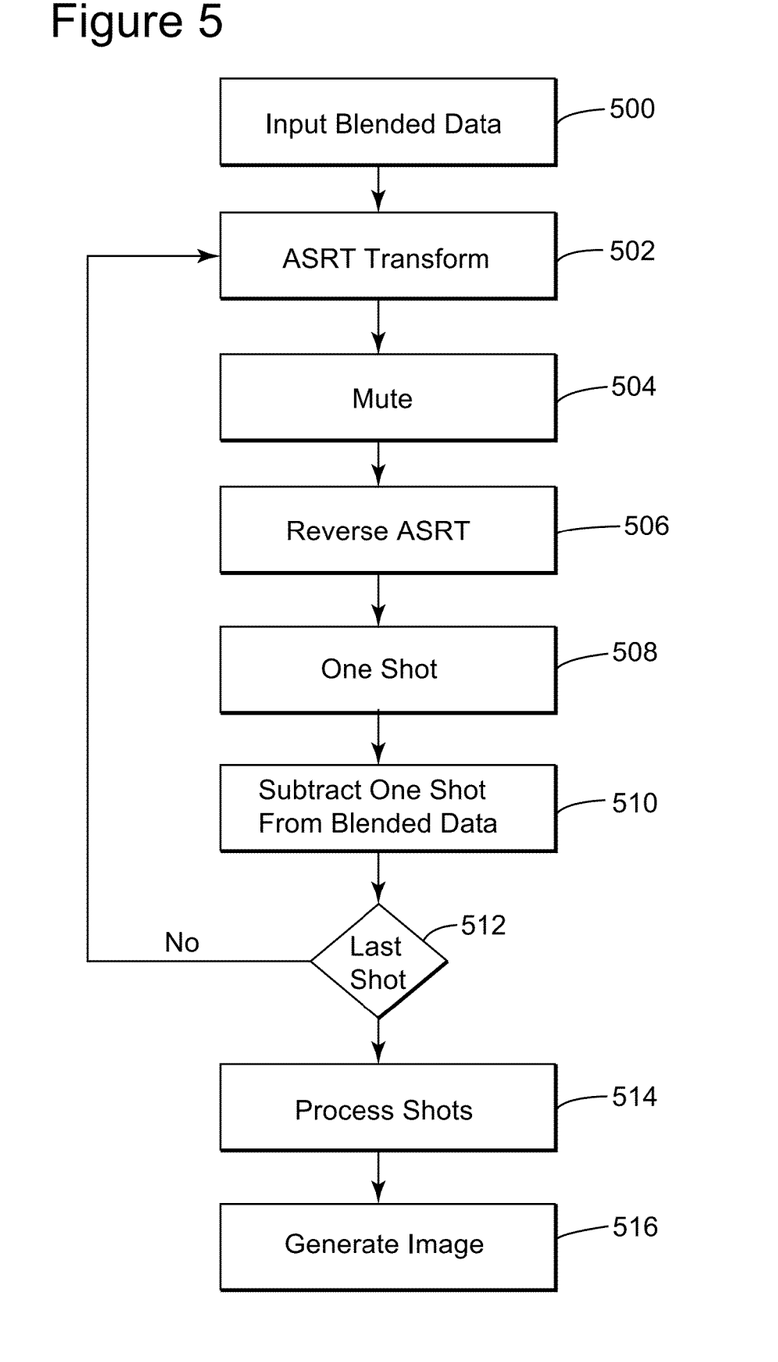
FIG. 5 is a flowchart of a method for separating shots from blended data according to an exemplary embodiment.
Figure 6:
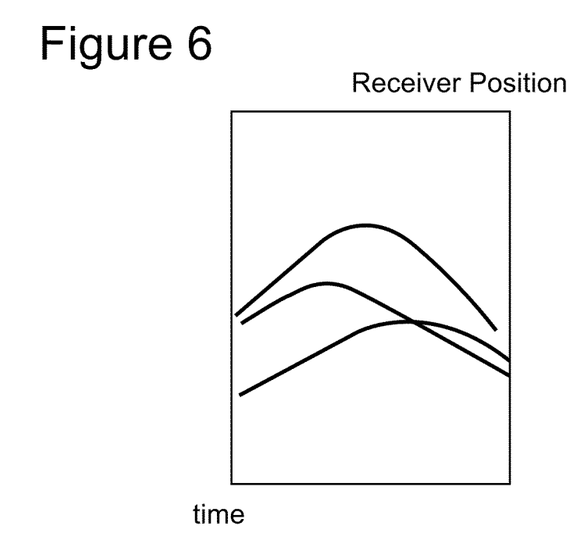
FIG. 6 is an illustration of blended seismic data in a first domain.
Figure 7:
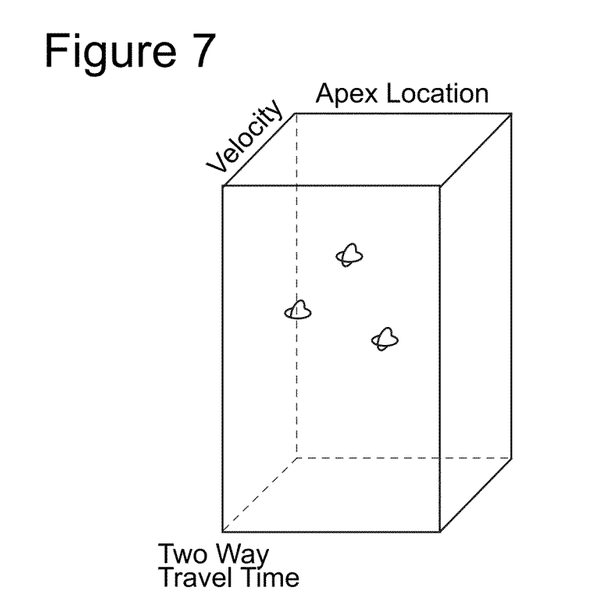
FIG. 7 is an illustration of the blended seismic data transformed in a second domain with a novel transformation according to an exemplary embodiment.

The novel algorithm discussed above is now summarized with respect to a flowchart illustrated in FIG. 5. In step 500 recorded seismic data is received. This data is blended, i.e., includes recordings from multiple sources simultaneously actuated. The blended data is transformed in step 502, from the time-space domain to another domain by an ASRT transformation. The other domain may be any desired domain. The blended data is illustrated in FIG. 6 and the ASRT transformed data is illustrated in FIG. 7. The mute process is applied in step 504 to the ASRT data. As discussed above, the mute may be based on location and/or amplitude of the data. In other words, the mute may be applied based only on the locations of the shots, only on the amplitudes of the recorded wavelets corresponding to the shots or based on both the location and amplitude, in either order.

After a first shot is isolated using the mute process, the corresponding data is ASRT reversed in step 506 for obtaining in step 508 the first shot in the time-space domain. The first shot is subtracted in step 510 from the blended data and then in step 512 it is verified whether all the shots have been extracted. If the answer is no, the algorithm returns to step 502 and applies the ASRT transform to the blended data from which the first shot has been subtracted. The algorithm continues until the last shot is separated. When the last shot was separated, the algorithm advances to step 514 in which various known seismic data processing steps may be applied. Finally, in step 516, an image of the surveyed subsurface may be generated and displayed on a display for further analysis.

The above-discussed novel algorithm allows recreating, at a lower cost, the data that would have been acquired without blending. The quality of the separation depends mostly on the distance between shots and the complexity of the geology. The use of Sparse Inversion, also known as High Resolution, allows one to separate shots that are very close together. Thus, using this novel de-blending technique, it is possible to recreate the individual shots with small error compared to what would be available with a more expensive acquisition.

The achieved separation is fast and flexible comparative to the existing algorithms. The novel algorithm does not require a very expensive implementation because it can work on one line of receivers at a time. Multidimensional ASRTs can also be implemented to improve constraint and resolution. Because the novel technique does not require any information about geometry or shot locations, it is possible to apply it in an automatic fashion.

To conclude, simultaneous acquisition of shots is cheaper and/or denser than sequential acquisition of shots. A problem with this type of blended surveys is that each trace contains contribution from several shots and, therefore, algorithms that require an exact knowledge of offset and azimuth suffer from leakage noise. This noise is the energy from all sources except the one corresponding to the particular offset-azimuth considered on each instance. To allow conventional processing of blended acquisitions a novel technique based on Apex Shifted Radon Transform was introduced.

Figure 8:
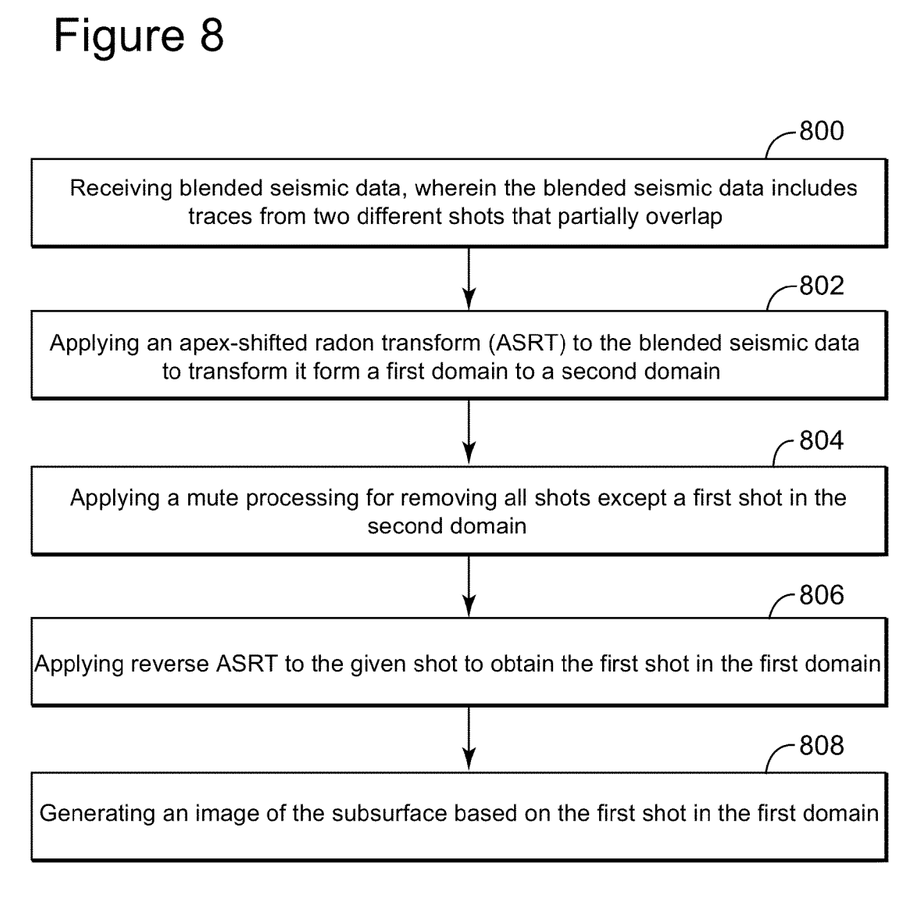
FIG. 8 is a flowchart of another method for separating shots from blended data according to an exemplary embodiment.

A flowchart illustrating steps of a method for de-blending seismic data associated with a subsurface of the earth is now discussed with reference to FIG. 8. The method includes a step 800 of receiving blended seismic data, wherein the blended seismic data includes traces from two different shots that partially overlap; a step 802 of applying an apex-shifted radon transform (ASRT) to the blended seismic data to transform it from a first domain to a second domain; a step 804 of applying a mute processing for removing all shots except a first shot in the second domain; a step 806 of applying a reverse ASRT to the given shot to obtain the first shot in the first domain; and a step 808 of generating an image of the subsurface based on the first shot in the first domain.

Figure 9:
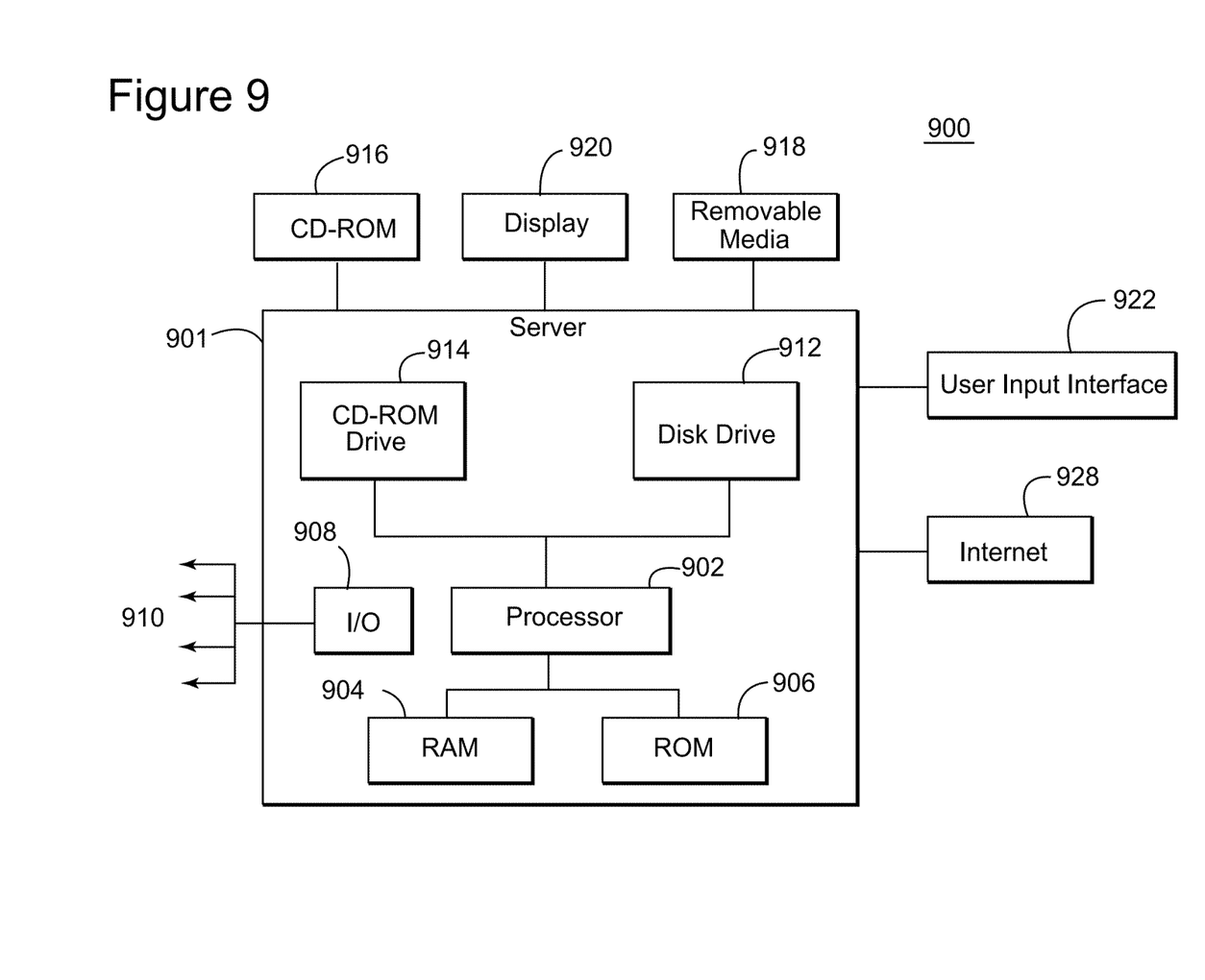
FIG. 9 is an illustrating of a computing device that implements a method for de-blending data.

The above method and others may be implemented in a computing system specifically configured to calculate the image of the subsurface. An example of a representative computing system capable of carrying out operations in accordance with the exemplary embodiments is illustrated in FIG. 9. Hardware, firmware, software or a combination thereof may be used to perform the various steps and operations described herein.

The exemplary computing system 900 suitable for performing the activities described in the exemplary embodiments may include a server 901. Such a server 901 may include a central processor (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as are known in the art, as dictated by software and/or firmware instructions.

The server 901 may also include one or more data storage devices, including a hard drive 912, CD-ROM drives 914, and other hardware capable of reading and/or storing information such as DVD, etc. In one embodiment, software for carrying out the above-discussed steps may be stored and distributed on a CD- or DVD-ROM 916, removable memory device 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD, LED displays, plasma displays, cathode ray tubes (CRT), etc. A user input interface 922 is provided, including one or more user interface mechanisms such as a mouse, keyboard, microphone, touchpad, touch screen, voice-recognition system, etc.

The server 901 may be coupled to other computing devices, such as landline and/or wireless terminals via a network. The server may be part of a larger network configuration as in a global area network (GAN) such as the Internet 928, which allows ultimate connection to various landline and/or mobile client devices. The computing device may be implemented on a vehicle that performs a land seismic survey.

The disclosed exemplary embodiments provide a system and a method for de-blending recorded seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for de-blending seismic data associated with a subsurface of the earth, the method comprising:
  receiving blended seismic data, wherein the blended seismic data includes traces having energies from two or more different shots that partially overlap;
  applying an apex-shifted radon transform (ASRT) to the blended seismic data to transform it from a first domain to a second domain;
  applying a mute processing for removing all shots except a first shot in the second domain;
  applying a reverse ASRT to the given shot to obtain the first shot in the first domain; and
  generating an image of the subsurface based on the first shot in the first domain.

2. The method of claim 1, further comprising:
  subtracting the first shot from the blended seismic data in the first domain; and
  applying the ASRT transform, the mute processing and the reverse ASRT transform to the blended seismic data without the first shot to obtain a second shot in the first domain.

3. The method of claim 2, further comprising:
  de-blending the blended seismic data until all shots are separated in the first domain.

4. The method of claim 1, wherein the step of applying a mute processing further comprises:
  using a location of the shots in the second domain to remove all but the first shot in the second domain.

5. The method of claim 1, wherein the step of applying a mute processing further comprises:
  using an amplitude of the shots in the second domain to remove all but the first shot in the second domain.

6. The method of claim 1, wherein the ASRT transform is given by:

$$\text{model}(\tau,\alpha,\upsilon)=\Sigma_{x=x(1)}^{x(nx)}\text{data}(t(\tau,\alpha,\upsilon),x),$$

where "data" represents the recorded data, "model" represents the constructed model that describes the data "data," t is the travel time of the data at offset x, $\tau$ and $\alpha$ are location coordinates of apexes of hyperbolic events, and $\upsilon$ is a velocity parameter that defines a curvature of each event on each apex.

7. The method of claim 6, wherein the time t is a function of the model parameters ($\tau$, $\alpha$, $\upsilon$) as follows:

$$t=\left[\left(\frac{\tau}{2}\right)^2+\left(\frac{x-\alpha}{\upsilon}\right)^2\right].$$

8. The method of claim 1, wherein the step of applying the ASRT transform comprises:
  finding a model by using $$\text{data}(t(\tau,\alpha,\upsilon),x)_{pred}=\Sigma_{\upsilon=1}^{n\upsilon}\Sigma_{\alpha=\alpha(1)}^{\alpha(n\alpha)}\text{model}(\tau,\alpha,\upsilon)$$

where "$\text{data}_{pred}$" represents predicted data, "model" represents the constructed model that describes the predicted data, t is the travel time of the blended seismic data at offset x, $\tau$ and $\alpha$ are location coordinates of apexes of hyperbolic events, and $\upsilon$ is a velocity parameter that defines a curvature of each event on each apex; and
  predicting the blended seismic data "data" with a minimum square error given by $$J=\|\text{data}-\text{data}_{pred}\|_2,$$

where J is a cost function, "data" is the blended seismic data, and $\|\ \|$ is an l2 norm.

9. A computing device configured to de-blend seismic data associated with a subsurface of the earth, the computing device comprising:
  an interface configured to receive blended seismic data, wherein the blended seismic data includes traces having energies from two different shots that partially overlap; and
  a processor connected to the interface and configured to,
  apply an apex-shifted radon transform (ASRT) to the blended seismic data to transform it from a first domain to a second domain;
  apply a mute processing for removing all shots except a first shot in the second domain;
  apply a reverse ASRT to the given shot to obtain the first shot in the first domain; and
  generate an image of the subsurface based on the first shot in the first domain.

10. The computing device of claim 9, wherein the processor is further configured to:
  subtract the first shot from the blended seismic data in the first domain; and
  apply the ASRT transform, the mute processing and the reverse ASRT transform to the blended seismic data without the first shot to obtain a second shot in the first domain.

11. The computing device of claim 10, wherein the processor is further configured to:
  de-blend the blended seismic data until all shots are separated in the first domain.

12. The computing device of claim 9, wherein the processor is further configured to:
  use a location of the shots in the second domain to remove all but the first shot in the second domain.

13. The computing device of claim 9, wherein the processor is further configured to:
  use an amplitude of the shots in the second domain to remove all but the first shot in the second domain.

14. The computing device of claim 9, wherein the ASRT transform is given by:

$$\text{model}(\tau,\alpha,\upsilon)=\Sigma_{x=x(1)}^{x(nx)}\text{data}(t(\tau,\alpha,\upsilon),x),$$

where "data" represents the recorded data, "model" represents the constructed model that describes the data "data," t is the travel time of the data at offset x, $\tau$ and $\alpha$ are location coordinates of apexes of hyperbolic events, and $\upsilon$ is a velocity parameter that defines a curvature of each event on each apex.

15. The computing device of claim 14, wherein the time t is a function of the model parameters ($\tau$, $\alpha$, $\upsilon$) as follows:

$$t=\left[\left(\frac{\tau}{2}\right)^2+\left(\frac{x-\alpha}{\upsilon}\right)^2\right].$$

16. The computing device of claim 9, wherein the processor is further configured to:
  find a model "model" by using $$\text{data}(t(\tau,\alpha,\upsilon),x)_{pred}=\Sigma_{\upsilon=1}^{\alpha(n\alpha)}\Sigma_{\alpha(1)}^{\alpha(n\alpha)}\text{model}(\tau,\alpha,\upsilon)$$

where "$\text{data}_{pred}$" represents predicted data, the "model" represents the constructed model that describes the predicted data, t is the travel time of the blended seismic data at offset x, τ and α are location coordinates of apexes of hyperbolic events, and υ is a velocity parameter that defines a curvature of each event on each apex; and predict the blended seismic data "data" with a minimum square error given by $$J=\|data-data_{pred}\|_2,$$

where J is a cost function, "data" is the blended seismic data, and $\|\ \|$ is an l2 norm.

17. A non-transitory computer readable medium including computer executable instructions, wherein the instructions, when executed by a processor, implement a method for de-blending seismic data associated with a subsurface of the earth, the instructions comprising:

receiving blended seismic data, wherein the blended seismic data includes traces having energies from two different shots that partially overlap;

applying an apex-shifted radon transform (ASRT) to the blended seismic data to transform it from a first domain to a second domain;

applying a mute processing for removing all shots except a first shot in the second domain;

applying a reverse ASRT to the given shot to obtain the first shot in the first domain; and generating an image of the subsurface based on the first shot in the first domain.

18. The medium of claim 17, further comprising:

subtracting the first shot from the blended seismic data in the first domain;

applying the ASRT transform, the mute processing and the reverse ASRT transform to the blended seismic data without the first shot to obtain a second shot in the first domain; and de-blending the blended seismic data until all shots are separated in the first domain.

19. The medium of claim 17, wherein the ASRT transform is given by:

$$model(\tau,\alpha,\upsilon)=\Sigma_{x=x(1)}^{x(nx)}data(t(\tau,\alpha,\upsilon),x),$$

where "data" represents the recorded data, "model" represents the constructed model that describes the data "data," t is the travel time of the data at offset x, τ and α are location coordinates of apexes of hyperbolic events, and υ is a velocity parameter that defines a curvature of each event on each apex.

20. The medium of claim 19, wherein the time t is a function of the model parameters (τ, α, υ) as follows:

$$t=\left[\left(\frac{\tau}{2}\right)^2+\left(\frac{x-\alpha}{\upsilon}\right)^2\right].$$

* * * * *